(No Model.)
J. CAVEN.
CONDENSING APPARATUS.
No. 455,471. Patented July 7, 1891.
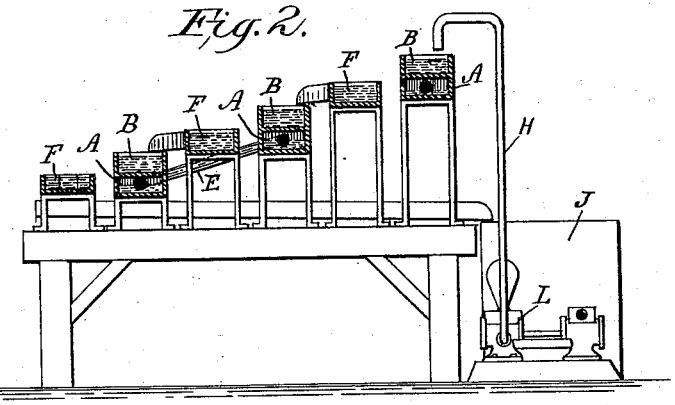
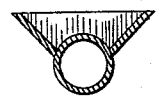
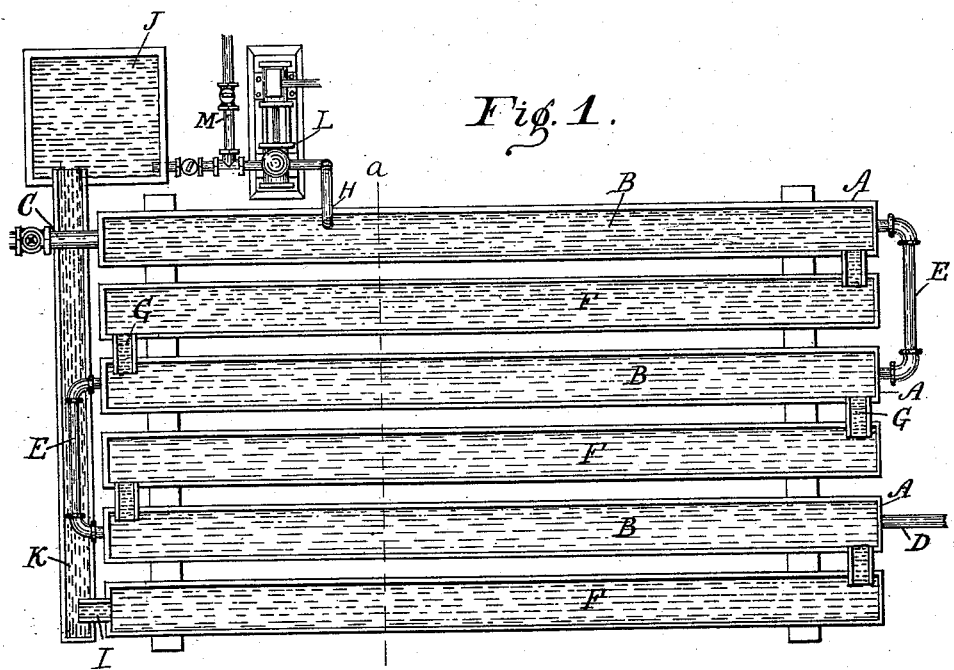
WITNESSES:
Mabel Hood.
V. M. Hood.
INVENTOR
John Caven.
BY H. P. Hood.
ATTORNEY

UNITED STATES PATENT OFFICE.

JOHN CAVEN, OF INDIANAPOLIS, INDIANA.

CONDENSING APPARATUS.

SPECIFICATION forming part of Letters Patent No. 455,471, dated July 7, 1891.

Application filed April 20, 1891. Serial No. 389,572. (No model.)

*To all whom it may concern:*

Be it known that I, JOHN CAVEN, a citizen of the United States, residing at Indianapolis, in the county of Marion and State of Indiana, have invented a new and useful Condensing Apparatus, of which the following is a specification.

My invention relates to an improved apparatus for condensing exhaust-steam.

The object of my improvement is to provide in an apparatus for condensing exhaust-steam means for circulating the steam in pipes or tubes having a large area exposed to the action of a current of running water, and means for cooling said water and returning it to the source of supply, so that the same body of water may be repeatedly used in the process of condensing the steam, all as hereinafter fully described.

The accompanying drawings illustrate my invention.

Figure 1 is a plan. Fig. 2 represents a vertical transverse section at $a$, Fig. 1. Fig. 3 represents a transverse section of a modified form of the combined steam and water pipe.

In the drawings, A A A represent a series of steam-pipes, preferably rectangular in section and having formed upon their upper surface an open water-trough B. The steam-pipes A are connected in series, so as to form a continuous passage for the steam from the inlet-pipe C to the outlet-pipe D by the pipes E E. Arranged between and alternately with the steam-pipes A are a series of open water-troughs F, which are connected at opposite ends to the water-troughs B, formed on the steam-pipes, by short spouts G, so as to form with the troughs B a continuous water-passage from the inlet-pipe H to the discharge-spout I. The whole series of steam-pipes and water-troughs are so arranged that water will flow by the force of gravitation from the first to the last of the series.

J is a reservoir, which is connected with the discharge-spout I by a trough K. Water is raised and discharged into the first of the troughs B by means of a pump L, which receives its supply principally from reservoir J, which supply may be supplemented when necessary by water from any ordinary source of supply through the pipe M.

The operation of this apparatus is as follows: The exhaust-steam being admitted to the steam-pipes A through the inlet-pipe C, the troughs B are filled with water through the pipe H, leading from the pump L. The water flows in a continuous stream through the troughs B and F, being alternately heated in the troughs B, from contact with the steam-pipe A, and cooled in the troughs F, and being finally discharged through spout I and trough K into the reservoir J, from whence it is taken and again put into circulation by the pump L.

By means of this apparatus the steam is rapidly condensed and discharged as water at the outlet-pipe D, from whence it may be conducted to a suitable reservoir or may pass directly to the feed-water pump of a steam-boiler.

The water which is used to absorb the heat from the steam-pipe being cooled by its passage through the alternately-arranged troughs F and being further cooled in its passage to reservoir J, is prompt and efficacious in its action, and is subject to but little waste—an item of great importance where the water-supply is expensive.

The combined steam-pipe and water-trough is made, preferably, broad and rectangular in section, as shown, so as to expose a thin stratum of steam to the action of a broad water-surface; but it may be formed from ordinary steam-pipe by securing a pair of longitudinal flanges thereto, as illustrated in Fig. 3.

I claim as my invention—

1. In a condensing apparatus, the combination, with a series of steam-pipes having water-troughs thereon, said steam-pipes being connected in series, of a series of open water-troughs arranged alternately with said pipes and connected in series with said troughs, and a source of water-supply, whereby a current of water is caused to flow alternately over the surface of a steam-pipe and through a cooling-trough, substantially as and for the purpose set forth.

2. In a condensing apparatus, the combination of a series of steam-pipes having open water-troughs formed on their surface, the cooling-troughs arranged alternately with said steam-pipes and connected in series with the water-troughs thereof, the reservoir arranged to receive the water from the last of said series of troughs, and the pump arranged to force the water from said reservoir to the first of said series of troughs, all arranged to co-operate substantially as and for the purpose set forth.

JOHN CAVEN.

Witnesses:
 H. P. HOOD,
 V. M. HOOD.